United States Patent
Salmonowicz et al.

[11] Patent Number: 5,937,584
[45] Date of Patent: Aug. 17, 1999

[54] INTEGRAL SUPPORT FOR MOUNTING OF DOOR MODULE

[75] Inventors: Mark Stephen Salmonowicz, Royal Oak; Christopher Dean Kirkum, Mount Clemens, both of Mich.

[73] Assignee: General Motors Corporation, Detroit, Mich.

[21] Appl. No.: 08/874,623

[22] Filed: Jun. 13, 1997

[51] Int. Cl.⁶ ..................................................... B06J 5/04
[52] U.S. Cl. ............................................... 49/502; 49/352
[58] Field of Search ..................... 49/502, 352; 403/326, 403/335

[56] References Cited

U.S. PATENT DOCUMENTS

| | | | |
|---|---|---|---|
| 3,761,971 | 10/1973 | Behnke | 403/335 |
| 4,158,512 | 6/1979 | Hasselbacher | 403/294 |
| 4,678,359 | 7/1987 | Keen | 403/170 |
| 4,733,739 | 3/1988 | Lorenz et al. | 180/90 |
| 4,949,508 | 8/1990 | Elton | 49/502 |
| 4,949,509 | 8/1990 | Gold | 49/502 |
| 5,059,057 | 10/1991 | Graef | 403/298 |
| 5,112,157 | 5/1992 | Haarer | 403/292 |
| 5,155,960 | 10/1992 | Shaanan | 52/584 |
| 5,169,204 | 12/1992 | Kelman | 49/502 |
| 5,203,135 | 4/1993 | Bastian | 52/726 |
| 5,251,403 | 10/1993 | Compeau et al. | 49/502 |
| 5,275,074 | 1/1994 | Taylor et al. | 83/437 |
| 5,367,832 | 11/1994 | Compeau et al. | 49/502 |
| 5,443,364 | 8/1995 | Mistry et al. | 403/326 |
| 5,469,664 | 11/1995 | Staser et al. | 49/502 |
| 5,535,553 | 7/1996 | Staser et al. | 49/502 |
| 5,581,952 | 12/1996 | Kapes et al. | 49/502 |

*Primary Examiner*—Daniel P. Stodola
*Assistant Examiner*—Curtis A. Cohen
*Attorney, Agent, or Firm*—Charles E. Leahy; Kathryn A. Marra

[57] ABSTRACT

A door inner panel has a wall defining an opening for receiving a door hardware module. The wall has at least one cutout with upper and lower integrally bent flanges defining the upper and lower margins of the cutout of the door inner panel. The door hardware module includes a molded plastic frame having a network of molded plastic structural elements which support hardware mounting surfaces upon which various door hardware components is mounted. The structural elements include integrally molded receptacles having upper and lower slots which are adapted to interfit respectively onto the upper and lower integrally bent flanges of the wall cutout of the door inner panel so that the molded plastic frame becomes supported on the door inner panel in readiness for the installation of fasteners between the molded plastic frame and the wall of the door inner panel.

3 Claims, 4 Drawing Sheets

INTEGRAL SUPPORT FOR MOUNTING OF DOOR MODULE

TECHNICAL FIELD

The invention relates to a door hardware module including a one-piece plastic frame having an integrally molded receptacle which slip fits onto flanges bent integrally from a vehicle door inner panel to support the door module on the inner panel.

BACKGROUND OF THE INVENTION

It is known to be advantageous in motor vehicle doors to preassemble door hardware components such as the window regulator, door latch, door handle and other hardware components onto a module frame, thereby providing a door hardware module which is subsequently mounted onto the vehicle door. In particular, the prior art has taught the provision of a one piece plastic frame having a network of integrally molded structural elements which provide structural support for hardware mounting surfaces upon which the various hardware components are mounted. In such a modular door hardware arrangement, the door inner panel has a large opening for receiving the plastic frame and a plurality of fasteners are installed to attach the one piece plastic frame to the door inner panel.

It would be advantageous to provide improvements in the plastic frame and in the door inner panel to enable support of the module frame on the door inner panel prior to the installation of the fasteners.

SUMMARY OF THE INVENTION

According to the invention, a door inner panel has a wall defining an opening for receiving a door hardware module. The wall has at least one cutout with upper and lower integrally bent flanges defining the upper and lower margins of the cutout of the door inner panel. The door hardware module includes a molded plastic frame having a network of molded plastic structural elements which support hardware mounting surfaces upon which various door hardware components is mounted. The structural elements include integrally molded receptacles having upper and lower slots which are adapted to interfit respectively onto the upper and lower integrally bent flanges of the wall cutout of the door inner panel so that the molded plastic frame becomes supported on the door inner panel in readiness for the installation of fasteners between the molded plastic frame and the wall of the door inner panel.

BRIEF DESCRIPTION OF THE DRAWINGS

These and other objects, features and advantages of the invention will become apparent upon consideration of the description of the preferred embodiment and the appended drawings in which.

DESCRIPTION OF THE PREFERRED EMBODIMENT

Figure 1:
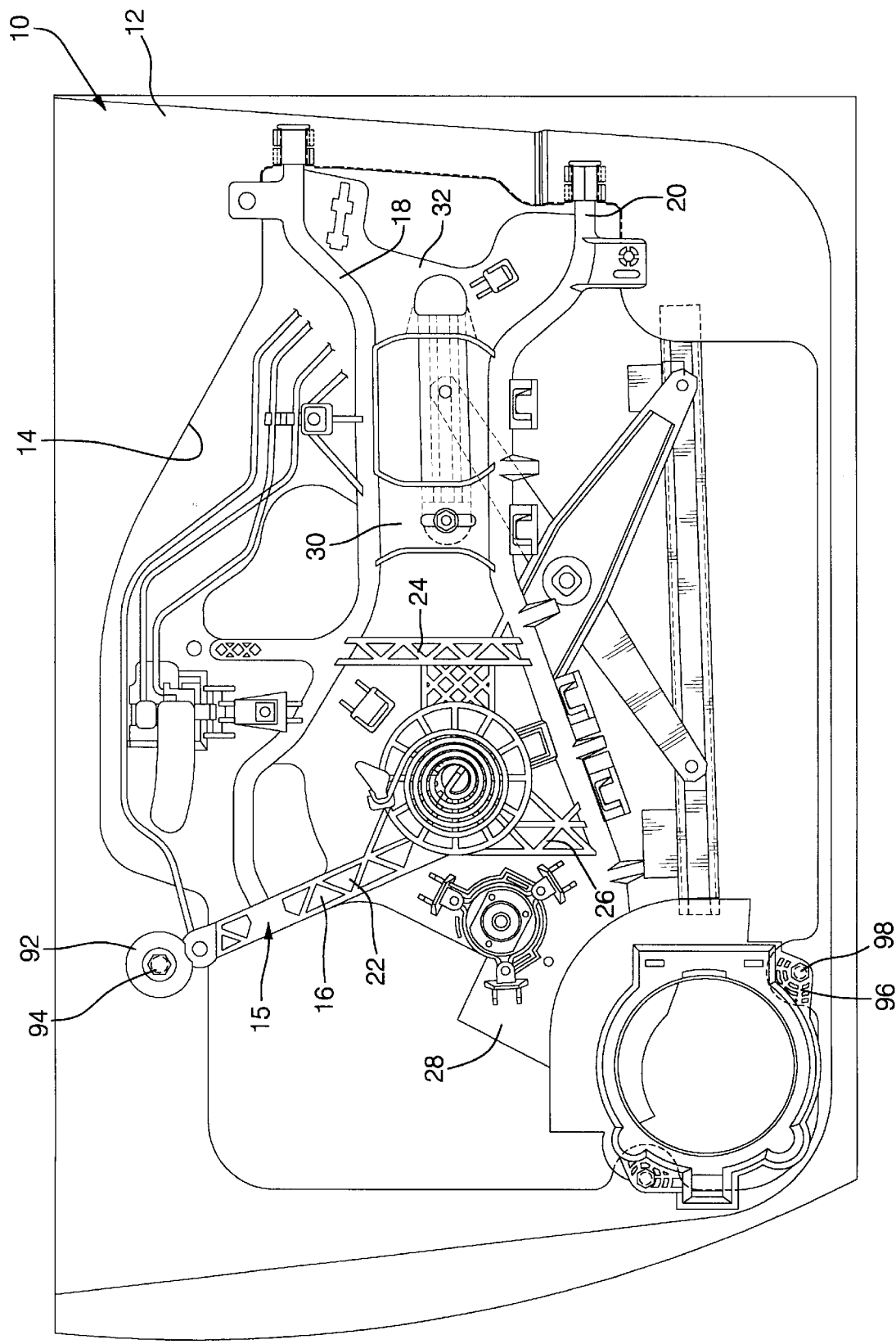
FIG. 1 is an elevation view of a vehicle door according to the present invention.

Referring to FIG. 1, there is shown a vehicle door indicated generally at 10 which is defined, in part, by a stamped metal door inner panel 12 having a large opening 14 therein for receiving a door hardware module. A door hardware module, generally indicated at 15, includes a molded plastic frame 16 which includes an upper longitudinal extending hollow beam 18 and a lower longitudinal extending hollow beam 20. Ribbed beams such as at 22, 24 and 26 extend between the hollow beams 18 and 20 and are integrally molded therewith. Generally planar hardware mounting surfaces such as at 28, 30 and 32 are integrally molded between the hollow beams 18 and 20 and the ribbed beams 22, 24 and 26 to provide mounting surfaces for various door hardware components such as the window regulator, door handles, etc.

The aforedescribed door hardware module 15 is advantageous in the assembly of motor vehicles in that the door hardware components may be installed onto the molded plastic frame 16 prior to the installation of the plastic frame 16 onto the inner panel 12.

Figure 2A:
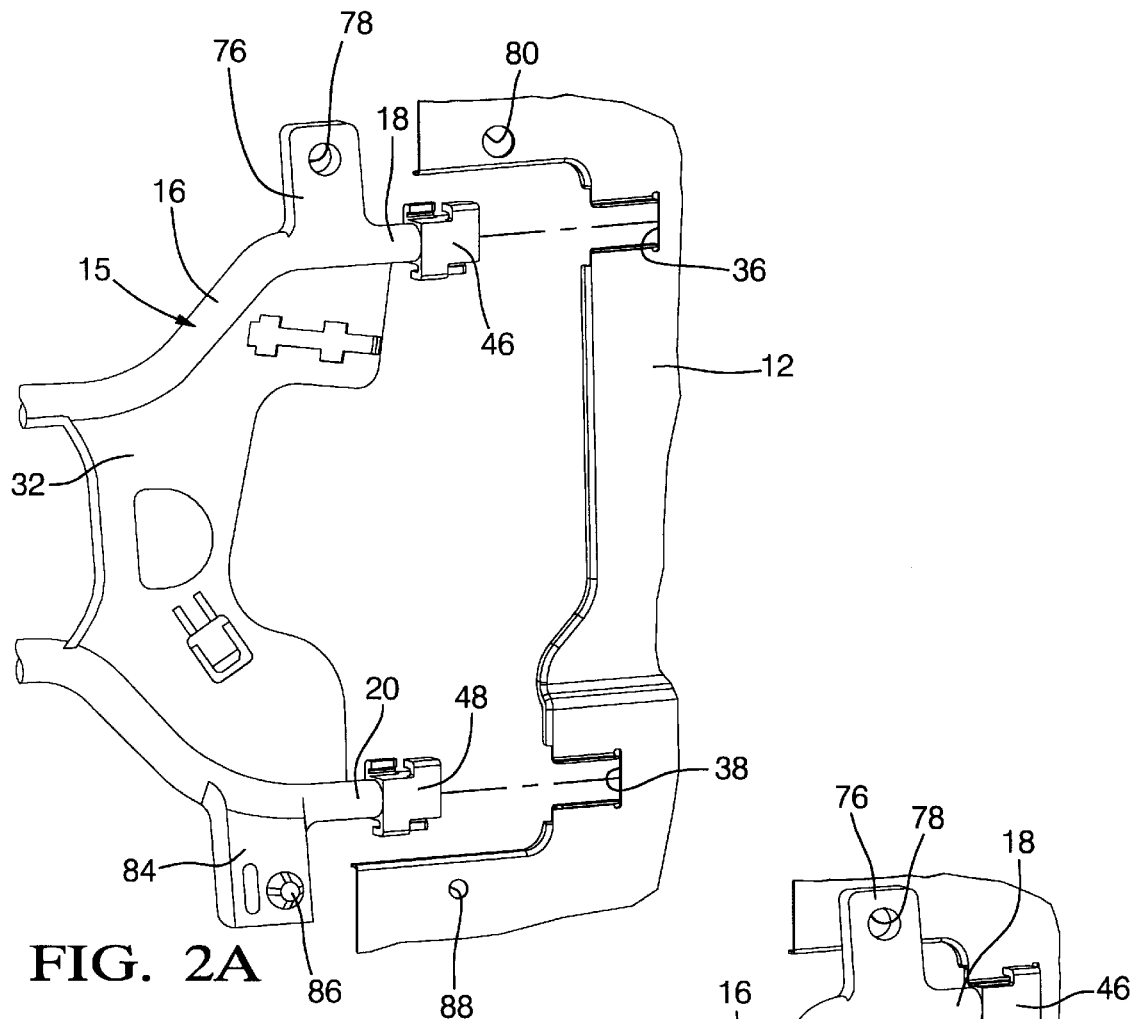
FIG. 2A is an enlarged fragmentary view showing the door hardware module aligned for interfitting installation onto the door inner panel.
Figure 3A:
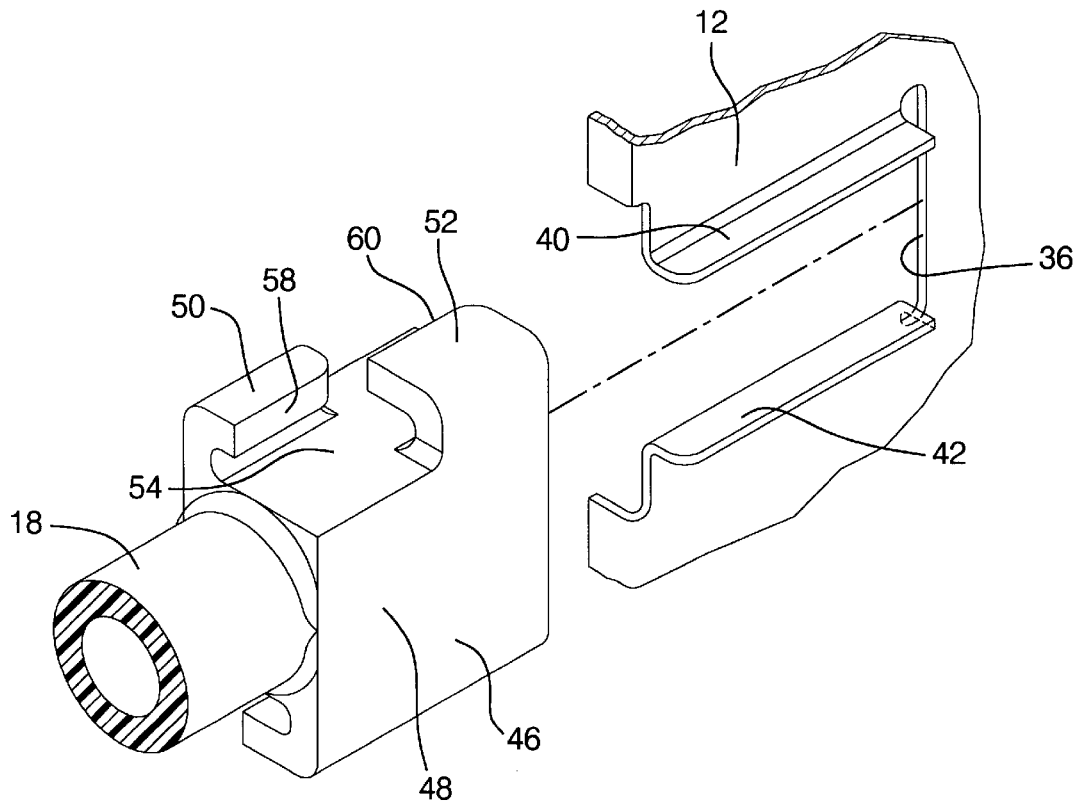
FIG. 3A is an enlarged fragmentary view corresponding to the portion of FIG. 2A.
Figure 3B:
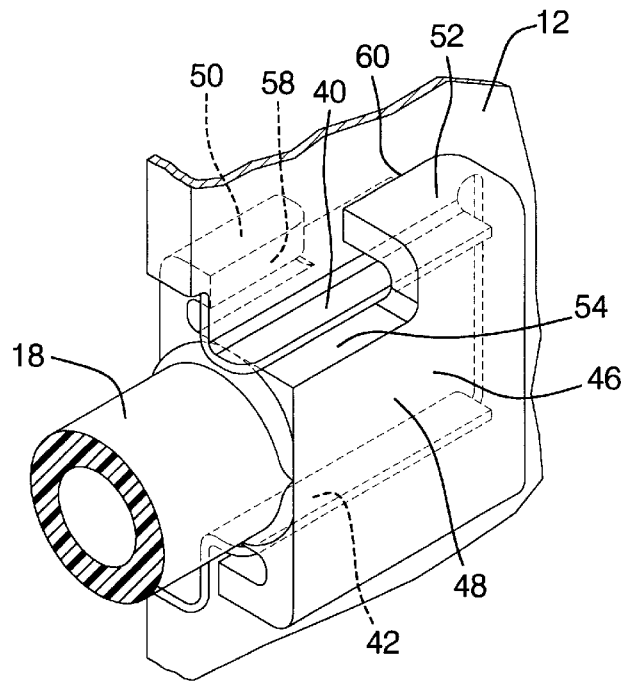
FIG. 3B is an enlarged fragmentary view corresponding to FIG. 2B.
Figure 4:
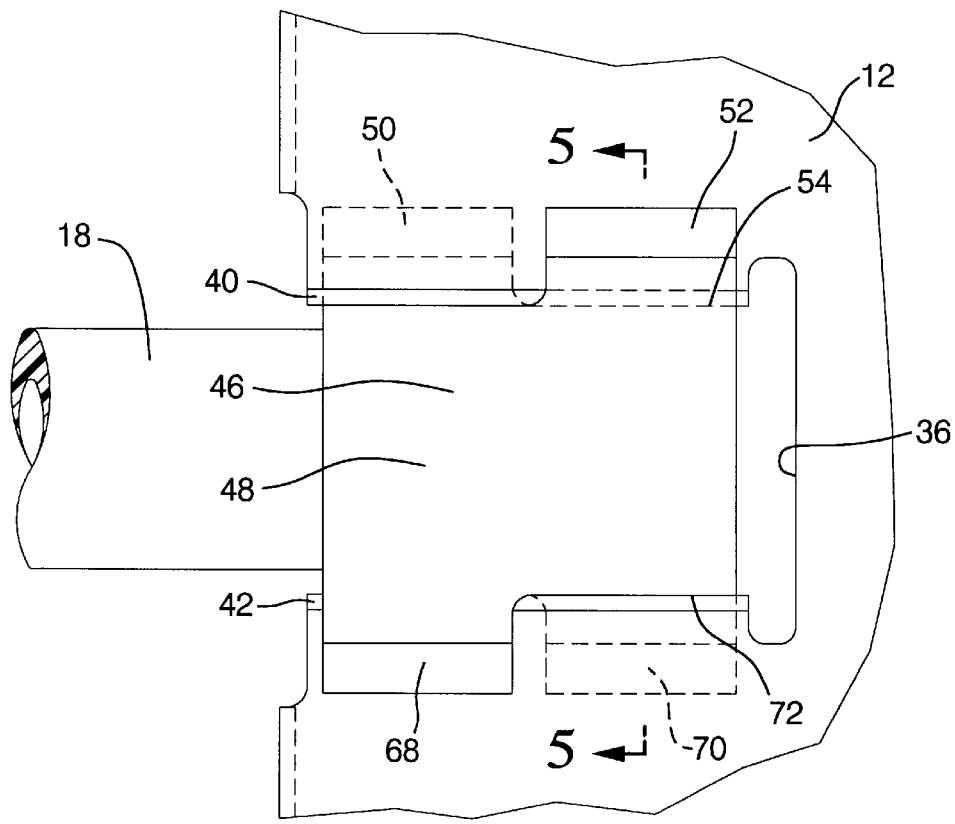
FIG. 4 is a side elevation view showing the interfit between the plastic frame and the door panel.

In order to facilitate the installation of the assembled door hardware module 15 into the opening 14 of the door inner panel 12, the present invention provides for a sliding interfit between the molded plastic frame 16 and the inner panel 12. In particular, as best seen in FIG. 2A, the inner panel 12 has an upper cutout 36 and a lower cutout 38 which align respectively with the upper hollow beam 18 and lower hollow beam 20 of the molded plastic frame 16. As best seen in FIG. 3A, the upper cutout 36 includes an upper flange 40 and a lower flange 42 which are integrally bent from the inner panel 12 so that the flanges 40 and 42 define the upper and lower margins of the cutout 38.

Referring again to FIG. 2A, it is seen that molded plastic receptacles 46 and 48 are integrally molded on the plastic frame 16 at the ends of the hollow tubular beams 18 and 20.

Figure 5:
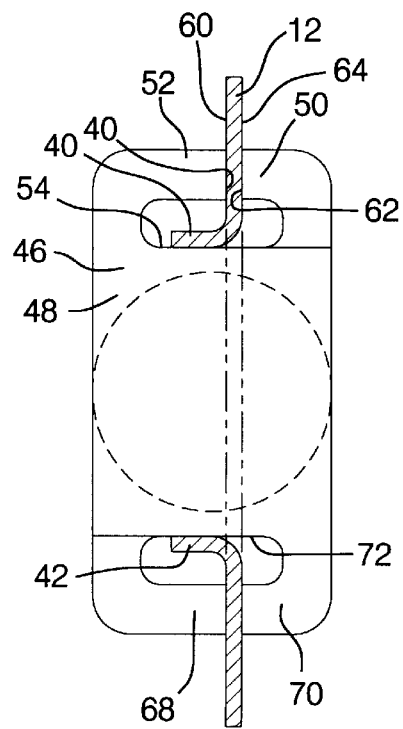
FIG. 5 is a section view taken in the direction of arrows 5—5 of FIG. 4.

As best seen in FIGS. 3A, 3B, 4 and 5, the receptacle 46 includes a generally rectangular base portion 48 having a pair of opposed facing abutments 50 and 52 at the upper edge thereof which cooperate to define a longitudinal extending slot 54 by which the receptacle 46 may be slip fit onto the flange 40 of the cutout 36 in the inner panel 12. As best seen in FIG. 5, the abutment 52 has an abutment face 58 which bears closely against the outer face 60 of door inner panel 12 and the abutment 50 has an abutment face 62 which bears closely upon face 64 or the inner panel 12.

In addition, it is seen that the receptacle 46 also includes a pair of lower abutments 68 and 70 which are constructed similar to the upper abutments 50 and 52 and respectively bear upon the inner panel 12 to cooperate with the upper abutments 50 and 52 in establishing the modular frame 18 in a transverse position upon the door inner panel 12.

Furthermore, as best viewed in FIG. 5, it is seen that the flanges 40 and 42 respectively bear closely upon the base portion 48 of the receptacle 46 to establish the up and down position of the module frame 18 in relation to the door inner panel 12.

Referring again to FIG. 2, it will be understood that the lower receptacle 48 is identical with the upper receptacle 46.

The lower receptacle 48 mates into the lower cutout 38 of the door inner panel in a manner identical to the mating of the upper receptacle 46 of the door cutout 36.

Figure 2B:
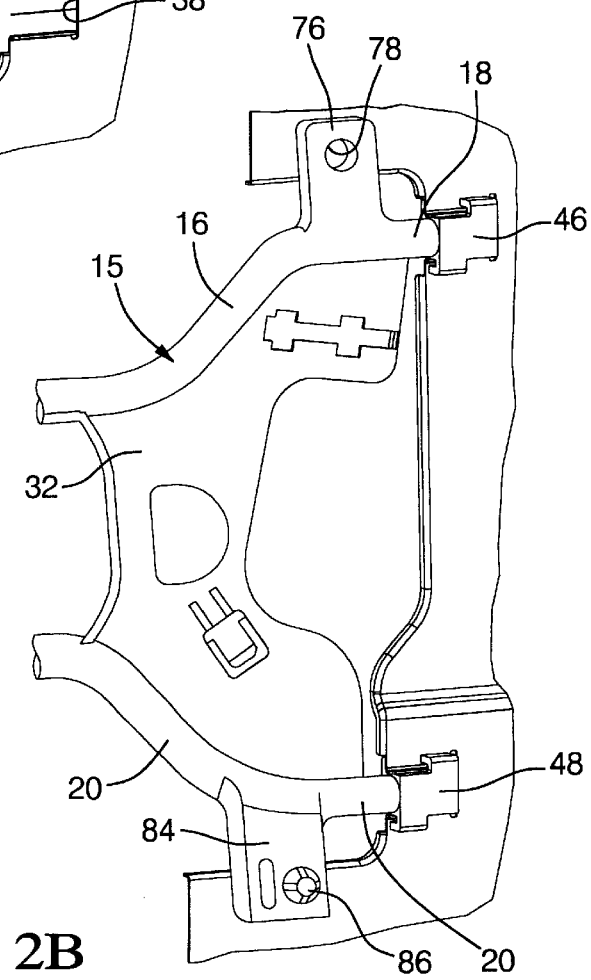
FIG. 2B shows the door module frame having been slid into interfitting connection with the door inner panel.

FIG. 2B shows the molded plastic frame 16 having been slid into a supporting relationship on the inner panel 12 via the interfitting of the receptacle 46 into the upper cutout 36 and the intermitting of the lower receptacle 48 into the lower cutout 38.

The installation of the molded plastic frame 16 onto the inner panel 12 is completed by the installation of a plurality of fasteners between the molded plastic frame 16 and the inner panel 12. In particular, as best seen in FIGS. 2A and 2B, the upper hollow beam 18 has a mounting ear 76 having a bolt hole 78 which will align with an aperture 80 in the inner panel 12. Similarly, the lower beam 20 has a mounting ear 84 with bolt hole 86 to align with an aperture 88 in the inner panel 12. As seen in FIG. 1, the molded plastic frame 16 also has, adjacent the rear end thereof, an upper mounting ear 92 having bolt hole 94 and a lower mounting ear 96 having a bolt hole 98. The installation of fasteners between the plastic frame 16 and inner panel 12 will retain the receptacles 46 and 48 within the cutouts 36 and 38 of the inner panel 12.

Thus, it is seen that the invention provides a new and improved vehicle door in which the module frame is conveniently supported on the vehicle door in readiness for the vehicle assembler to install fasteners between the plastic frame and the inner panel.

We claim:

1. A vehicle door comprising:

a door hardware module including a molded plastic frame having a network of molded plastic structural elements and hardware mounting surfaces;

a door inner panel having a wall defining an opening for receiving the door hardware module;

said door inner panel and said molded plastic frame having respective integrally formed slip-together interfitting elements by which the door hardware module is supported on the door inner panel; and a plurality of fasteners connecting the molded plastic frame and the door inner panel independent of the slip-together interfitting elements to attach the molded plastic frame to the door inner panel and thereby prevent disconnection of the slip-together interfitting elements.

2. A vehicle door comprising:

a door inner panel having a wall defining an opening, said wall defining the opening of the panel further having a cutout defined at least in part by a flange extending at an angle from the wall;

a door hardware module including a molded plastic frame having a network of molded plastic structural elements and hardware mounting surfaces, said molded plastic structural elements including at least one integrally molded receptacle adapted to slip fit onto the flange of the wall of the inner panel so that the molded plastic frame becomes supported on the door inner panel; and a plurality of fasteners connecting the molded plastic frame and the door inner panel independent of at least one molded receptacle and flange to attach the molded plastic frame to the door inner panel and thereby prevent disconnection of the slip-together interfitting elements.

3. A vehicle door comprising:

a door inner panel having a wall and the wall of the panel further having a cutout and upper and lower flanges defining upper and lower margins of the cutout;

a door hardware module including a molded plastic frame having a network of molded plastic structural elements and hardware mounting surfaces, said molded plastic structural elements including at least one integrally molded receptacle having upper and lower slots adapted to slip respectively onto the upper and lower flanges of the wall of the inner panel so that the molded plastic frame becomes supported on the door inner panel; and a plurality of fasteners connecting the molded plastic frame and the door inner panel independent of at least one molded receptacle and flange to attach the molded plastic frame to the door inner panel and thereby prevent disconnection of the slip-together interfitting elements.

* * * * *